United States Patent
Watts

(10) Patent No.: US 7,152,337 B2
(45) Date of Patent: Dec. 26, 2006

(54) ROBOTIC CARRIAGE FOR DATA COLLECTION

(75) Inventor: Robert Watts, Lorton, VA (US)

(73) Assignee: Shirley Contracting, Lorton, VA (US)

( * ) Notice: Subject to any disclaimer, the term of this patent is extended or adjusted under 35 U.S.C. 154(b) by 247 days.

(21) Appl. No.: 10/989,547

(22) Filed: Nov. 17, 2004

(65) Prior Publication Data

US 2006/0101781 A1    May 18, 2006

(51) Int. Cl.
*G01B 5/20* (2006.01)
*G01B 5/213* (2006.01)

(52) U.S. Cl. .................. 33/503; 33/1 C; 73/862.46; 52/749.1

(58) Field of Classification Search ............ 52/749.1; 33/503, 1 C; 73/760, 786, 826, 836, 862.46, 73/862.471, 862.392, 862.621
See application file for complete search history.

(56) References Cited

U.S. PATENT DOCUMENTS

| | | | | |
|---|---|---|---|---|
| 5,468,099 A | * | 11/1995 | Wheetley et al. | 408/1 R |
| 5,838,759 A | * | 11/1998 | Armistead | 378/57 |
| 5,867,003 A | * | 2/1999 | Hashimoto et al. | 318/568.11 |
| 5,881,470 A | * | 3/1999 | Hindman et al. | 33/503 |
| 6,144,519 A | * | 11/2000 | Hanaoka et al. | 360/92 |
| 6,443,543 B1 | * | 9/2002 | Chiang | 312/223.3 |
| 6,446,560 B1 | * | 9/2002 | Slocum | 104/88.03 |
| 7,062,962 B1 | * | 6/2006 | Pasternack et al. | 73/170.29 |
| 2003/0112717 A1 | * | 6/2003 | Plutt et al. | 369/30.45 |

* cited by examiner

*Primary Examiner*—Jeanette Chapman
(74) *Attorney, Agent, or Firm*—Roberts, Mlotkowski & Hobes; Thomas W. Cole

(57) ABSTRACT

A robotic carriage for measuring the camber of a large-span structural beam is provided. The carriage includes a frame having a platform supported by a plurality of legs having wheels rotatably mounted at the ends of the legs. The legs elevate the platform above vertically extending obstacles, such as shear studs, which are frequently present on the upper surface of large-span structural beams. The widthwise distance between the legs is adjustable so that the legs avoid contact with the shear studs while the carriage traverses the beam. The carriage includes a guide mechanism formed from a pair of opposing guide members moveably mounted on the frame into sliding engagement with opposing portions of the beam to maintain the carriage on a straight path. In operation, a surveying target is mounted on the top of the frame, and the carriage is moved into selected positions at known distance along the length of the structural beam. A laser-operated surveying apparatus measures the height of the prism at the selected points so that the camber of the beam may be calculated.

24 Claims, 8 Drawing Sheets

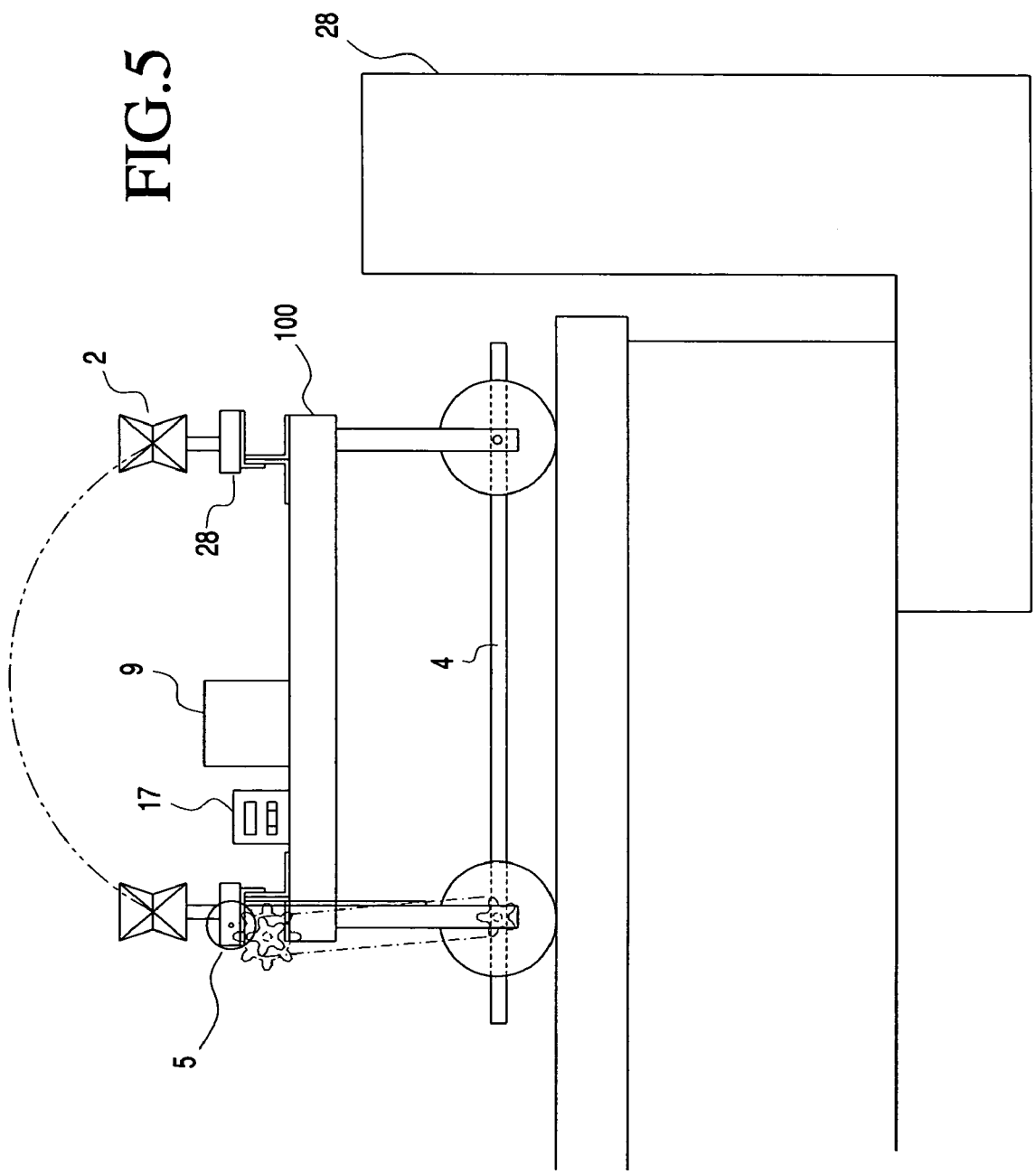

ROBOTIC CARRIAGE FOR DATA COLLECTION

BACKGROUND OF THE INVENTION

1. Field of the Invention

This invention generally relates to a robotic carriage capable of traversing the length of structural members used in the construction industry to collect data and to perform tasks. The invention is specifically concerned with a robotic carriage capable of carrying a surveying target at a known height to selected locations along the length of a large span structural beam so that the camber of the beam can be determined.

2. Description of Related Art

In the construction industry, and bridge building in particular, when large span structural beams are set in place, their camber must be assessed. Camber refers to a deliberately imposed and carefully calculated arching of structural beams in a direction opposite to the load forces that will ultimately be applied to the beams so that the beams deflect to desired position when the load forces are applied. The field measurement of camber is compared to engineering calculations of the desired camber, and the results used in further construction actions to insure proper deck thickness and elevation.

The customary method used after beams are positioned atop their support structures is to recall the surveyors or field engineers to obtain elevation data at specified intervals along the top flange of each beam relative to a datum plan grade line. This is usually accomplished by use of a surveying device, such as Topcon™ model ATF30, in combination with a standard engineering level rod. The location of the elevation readings must be provided atop the beam for use by future workers. This is usually done by workmen walking along the top of the beam using a measuring tape to locate the required intervals and applying a spot of paint or ink at each location. A growing number of field engineers use a laser operated survey instrument, such as Leica™ model TPS 1100, which is capable of locking onto a surveying target such as a prism and automatically following its movement, thereby providing measurement of required intervals as well as the elevation data. Both methods, however, require construction personnel to wear a fall protection safety harness and lanyard that is attached to a secured cable extending the length of the area of interest, and to collect the data by the standard method of first locating the points along the beam where elevations are required with measuring tape and paint. The data is then collected by one person observing the rod readings through the Auto-Level from a remote location while another person walks atop the beam carrying the rod to the pre-marked locations to be observed. If a laser operated surveying station is used, the marking of the locations need not be a separate operation, since the worker carrying the prism and its pole with recording device would then have a marking device to carry and apply also.

These prior art methods are not only labor intensive and costly in both time and man-power but also present a serious risk to the safety of the worker when walking over a narrow top surface high above the ground. Worse yet, the top of such beams often includes vertical shear studs that pose a tripping hazard to workmen. Since such beams often span over automobile or pedestrian traffic, there is a further safety risk posed by the accidental dropping of level rods or prism poles from the substantial heights of such beams.

Accordingly, there is a need for a robotic device which can move a level rod, reflective prism, video camera, or other data collection device across the length of a large span beam without jeopardizing the safety of construction workers or traffic passing beneath the beam. Ideally, such a device should be able to reliably traverse the length of a variety of types of beams having different patterns of vertically extending shear studs, as well as beams having no shear studs at all. It would further be desirable if the device were compatible with commercially available surveying equipment.

SUMMARY OF INVENTION

Generally speaking, the invention is a robotic carriage particularly adapted for traversing the length of a structural member, such as a large beam, that eliminates or at least ameliorates all of the aforementioned shortcomings associated with the prior art. To this end, the robotic carriage comprises a frame, a plurality of wheels rollingly supporting said frame, a drive unit mounted on the frame and operatively connected to at least one of the wheels to drive the same, a processing and control unit mounted on the frame that controls the drive unit with position feedback, and a guide mechanism including a pair of opposing guide members movably mounted on the frame in sliding engagement with opposing portions of the structural member. The frame preferably includes a platform supported by a plurality of legs, and the wheels are rotatably mounted at the terminal ends of the legs. The legs are of sufficient height and width to support the platform above and ability to pass between any vertically extending obstacles on the upper surface of the structural members, such as vertical shear studs. The carriage preferably includes a leg-width adjustment mechanism that allows the width-wise distance between opposing legs to be adjusted so that the carriage can traverse the length of the beam without contacting potential obstacles, such as vertical shear studs and safety cable anchorages.

The guide members of the guide mechanism may include opposing edge guides that slidably engage width-wise opposing edges of the beam. The edge guides are pivotably mounted onto the frame of the carriage so that they pivot out of engagement with any obstacles that may be present on the edges of the structural beam. Preferably, the edge guides pivot back into sliding engagement after disengaging with such side-extending obstacles. In one embodiment of the invention, the edge guides fall back into their initial position via gravity after such engagement.

The guide mechanism may further include opposing guide rails that slidably engage opposing, vertically extending obstacles such as vertical shear studs on a structural beam. Each of the guide rails is at least as long as the length-wise distance between such obstacles to ensure that the rail engages at least two of the shear studs or other obstacles at all times. The opposing guide rails may be biased into sliding engagement with the sheer studs by way of a spring-type mechanism.

The robotic carriage may include a surveying target, such as a prism, GPS receiver or camera, mounted on the top of the frame platform. The processing and control unit determines the distances along the length of the beam that the carriage stops for surveying measurements or for remote visual inspection. The height between the surveying target and the bottom of the carriage wheels is known so that a commercially-available laser-type surveying device may be used to measure differences in height of the structural beam or other member at selected points along the length of the beam so that the camber of the beam may be calculated.

Finally, the robotic carriage may include a marking assembly, such as automatic or a remotely-controlled can of spray paint mounted on the frame for providing a visual mark along the length of the beam or other member to indicate the location of the carriage when the height-measurements are made by the surveying apparatus.

The robotic carriage of the invention obviates the need for a human operator to carry out the hazardous walk along the narrow width of a shear-studded beam while carrying data collection targets to measure the camber of large span structural beams. The robotic carriage of the present invention, when equipped with a video camera, also allows safe remote-controlled visual inspection of a structure.

These and other features and advantages of the essential parts of the robotic carriage for measuring the camber of structural members embodying the invention will become more apparent from the description which follows, given solely by way of example with respect to the accompanying drawings.

BRIEF DESCRIPTION OF THE DRAWINGS

FIG. 5 is a right side view of the first embodiment of the present invention.

DETAILED DESCRIPTION OF THE PREFERRED EMBODIMENT

Figure 1:
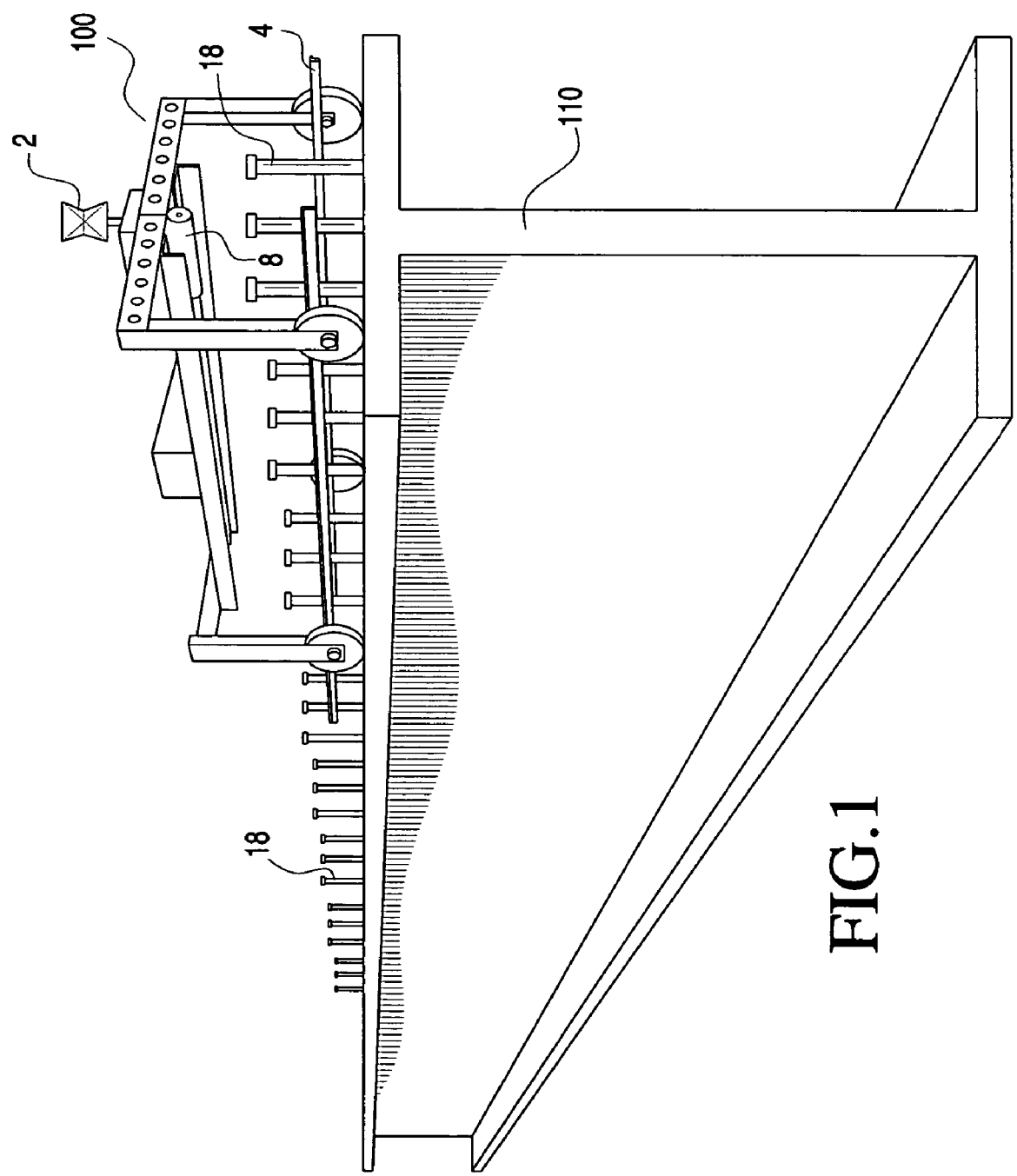
FIG. 1 is a perspective view of a first embodiment of the present invention.

FIG. 1 is a highly schematic view of a first embodiment of the robotic carriage 100 of the present invention. The carriage is shown traveling on a structural beam 110 using novel adjustable guide rails 4 in combination with shear studs 18 disposed on a top surface of the structural beam 110.

Figure 2:
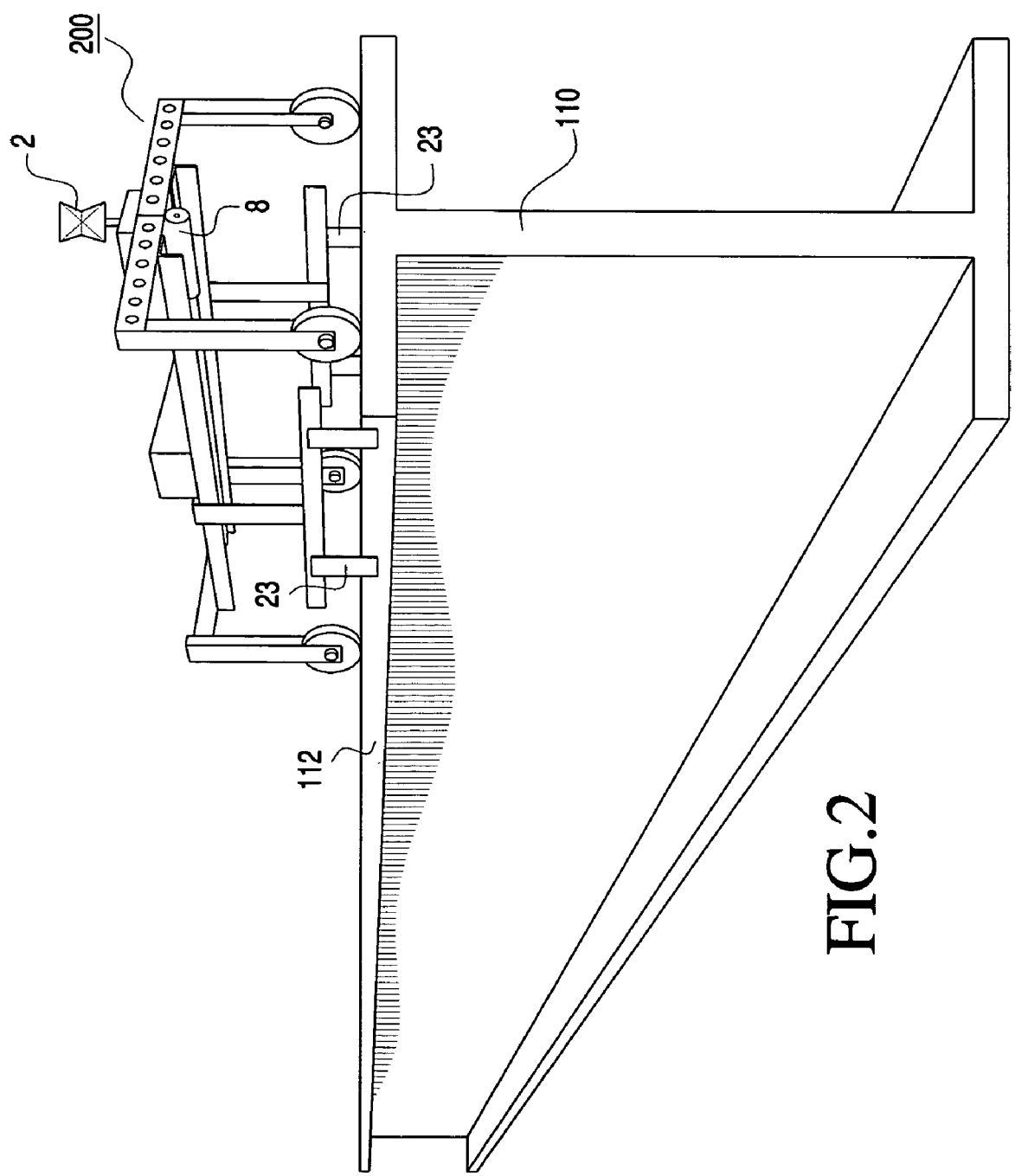
FIG. 2 is a perspective view of a second embodiment of the present invention.

FIG. 2 is a highly schematic view of a second embodiment of the robotic carriage 200 of the present invention. The carriage is shown traveling on a structural beam 110 using novel adjustable edge guides 23 in combination with the edges 112 of the structural beam 110. Features common to carriages 100 and 200 are given the same numerical labels, and the description of identical features is not repeated for the sake of brevity.

Figure 3:
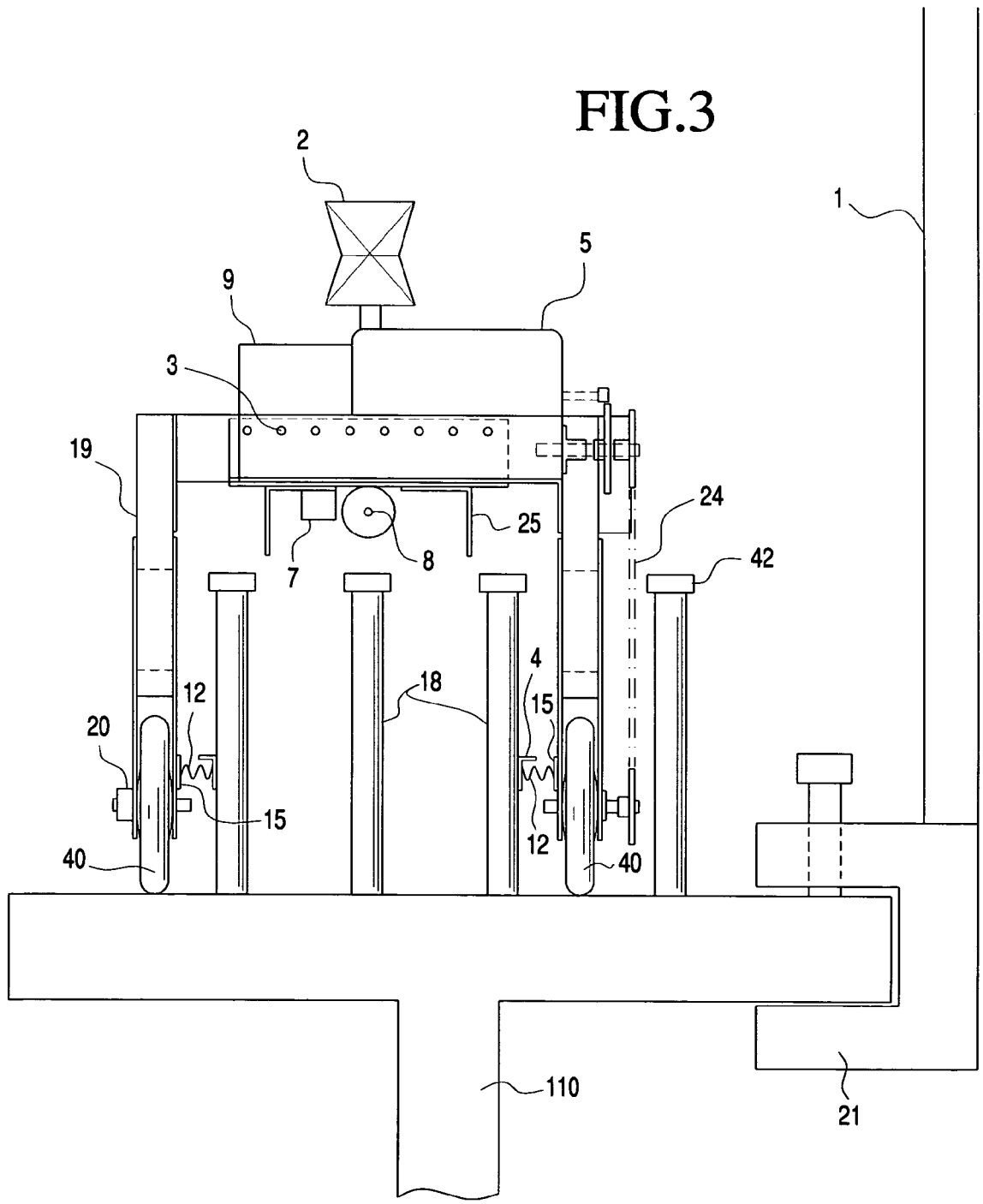
FIG. 3 is a front elevation view of the first embodiment of the present invention.

FIG. 3 is a front elevation view illustration of the carriage 100 of FIG. 1. The carriage 100 is in position atop a beam surface 110 with attached shear studs 18 and temporary safety cable support post 1 with anchorage assembly 21. In this preferred embodiment of the invention, the traveling carriage 100 comprises a rigid frame and platform 25 which houses a gear reduction unit 5 and components for drive operation, electrical battery supply 9, controls and processing interfaces (not shown), data collection target 2 with mounting hardware, and an emitter 8 with actuator 7 for dispensing marker paint. In lieu of the data collection target 2, or in combination thereof, a GPS receiver my be mounted on the carriage 100.

Further, as shown in FIG. 3, attached to the frame and platform 25 are rigid support members 19. The combination of the frame and platform 25 and the support members 19 constitute a span adjusting means which will be further described below. The support members 19 elevate the platform 25 and house the wheels 40 or tracks with their accompanying drive components, such as, sprockets, drive chains, feedback devices, and others. A battery powered motor (not shown) coupled to the gear reduction unit 5 is located in an elevated position and drives the wheels 40 or tracks by chain or belt means 24. The wheels 40 and chain or belt means 24 are hereinafter referred to as propulsion means. The motor is equipped with a braking mechanism (not shown) to ensure correct distance positioning of the carriage by avoiding inertial roll after motor disengagement.

In lieu of the motor, gear reduction unit 5, and chain or belt means 24 for driving the carriage, and one or more of wheel 40 may be a motor integrated with the wheel. Braking means may be performed by controlling the integrated motor.

Figures 7A, 7B:
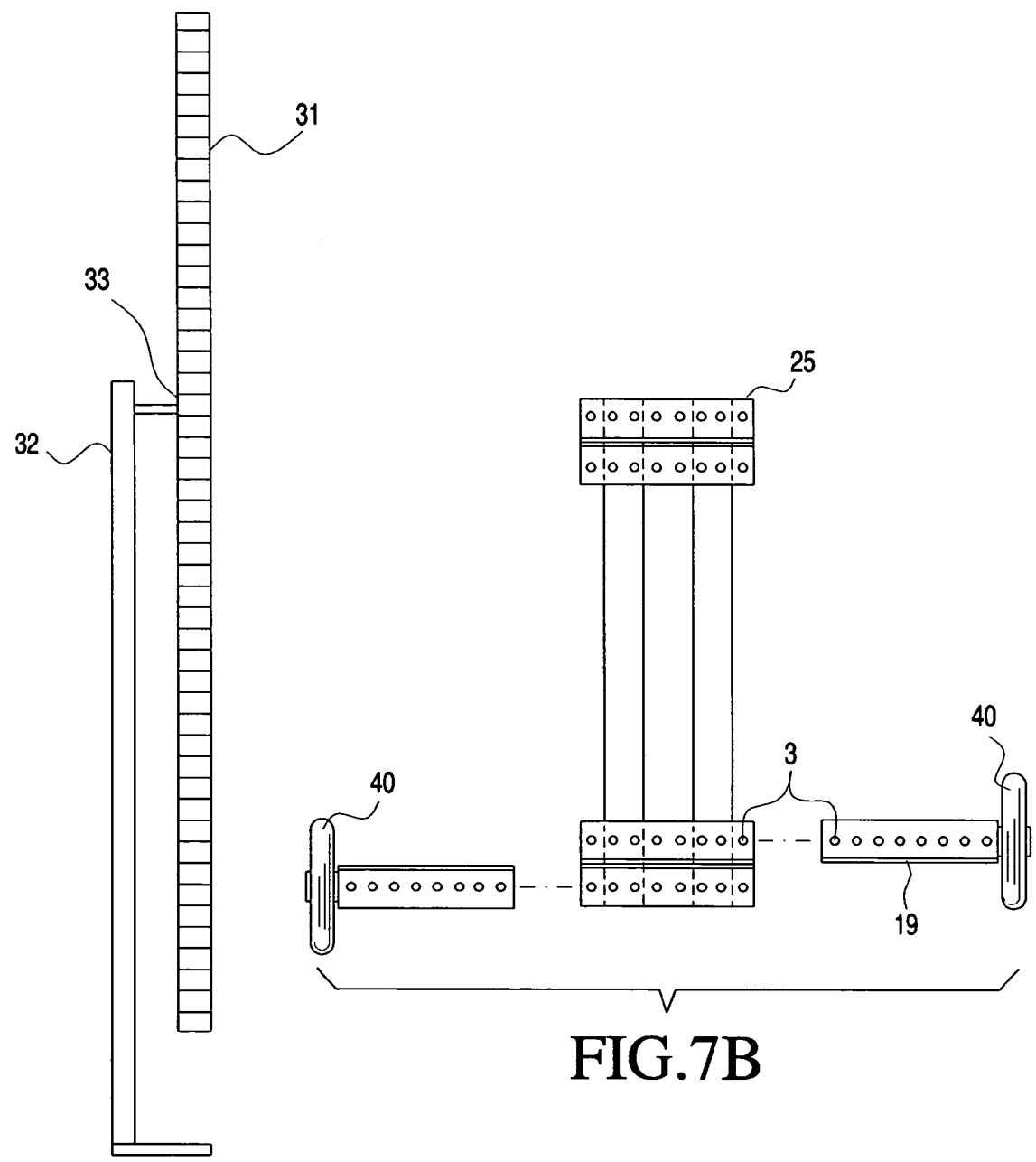
FIG. 7A is an illustration of a mounting assembly data collection target, reflective prism or graduated rod.
FIG. 7B is a top plan view of the frame and independently adjustable rigid support members.

The support members 19 and propulsion means elevate the frame and platform to a sufficient height so as to provide clearance above any vertical attachments to the surface, such as shear studs 18, that are within the planed path of the carriage. The support members 19 and propulsion means, are sufficiently narrow in cross-section to pass, unimpeded, between rows of vertical attachments, such as shear studs 18, to the surface of beam 110. These support members 19 with propulsion means are individually adjustable in distance from the frame and platform at initial setting so as to allow optimum wheel/track placement upon the surface. This individually adjustable distance of each support member 19 is accomplished by placing evenly spaced holes 3 within the frame 25 and within each support member 19, as illustrated in FIG. 7B.

Alternatively, frame 25 and support members 19 may be tubular, wherein each support member 19 is slidably mounted inside the tubular frame 25.

Each of the support members 19 is extended from or retracted to an appropriate distance from the frame for optimum placement upon the surface at hand. The holes 3 corresponding to a position in the frame and support member are aligned and secured in position with bolts, Clovis pins or other fastening devices. This allows the wheel base of the carriage to be adjustable in width and to accommodate various beam sizes, shear stud 18 arrangements, and required attachments, such as safety cable posts 1, and post anchorage placements 21.

Attached to these support members 19 and oriented to be parallel to the vertical rows of shear studs 18 are left and right adjustable guide rails 4 of a length sufficient to contact two or more members of the row of shear studs to be followed. These guide rails 4 are equipped with springs 12, as shown. Hydraulic pressure, or other means of maintaining contact with the beams attached to guiding shear studs 18 may also be utilized. The pressure applied by the spring 12 on these guide rails 4 in opposing directions is sufficient to maintain directional compliance while allowing small deviations encountered due to bent or misaligned shear studs.

Each of the guide rails 4 is adjustable as a unit relative to its supporting structure 15, and wheel assembly at an initial setting to accommodate the current spacing of shear studs or guiding surface presented. Each end of the guide rails 4 is preferably arcuate, similar to the front end of skis, so as to facilitate the gliding of the guide rails 4 over the vertical surface of the shear studs 18.

Figure 9A:
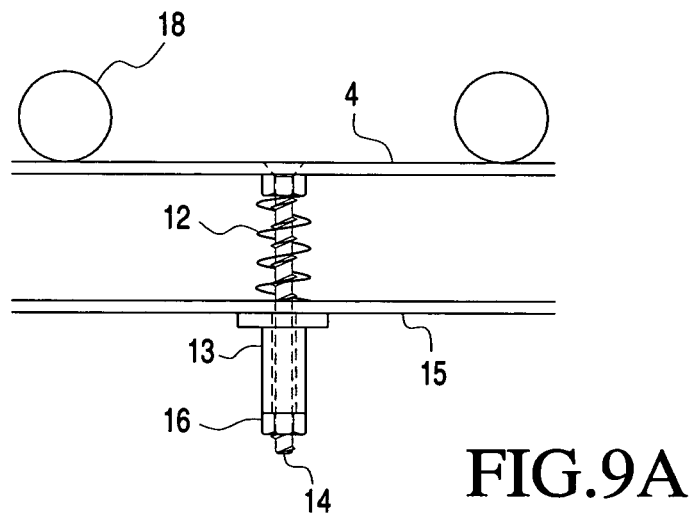
FIG. 9A is a top view of a spring pressure guide rail in contact with the vertical shear studs of the first embodiment of the present invention.
Figure 9B:
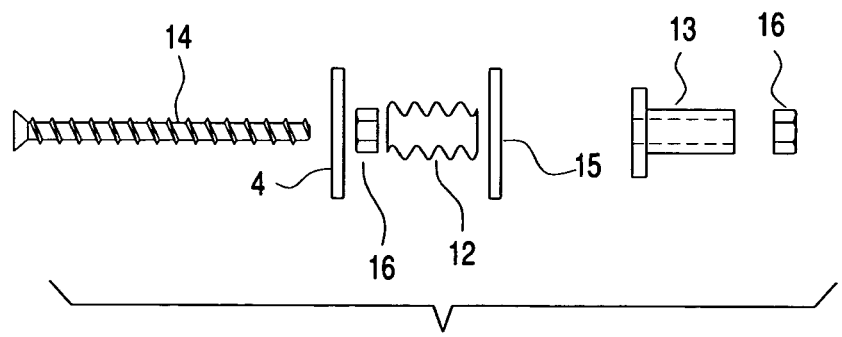
FIG. 9B is an exploded view of the spring pressure assembly of FIG. 9A.

FIGS. 9A and 9B illustrate an exemplary implementation of spring pressure guide rails 4. As shown, a machine screw 14 passes through the contact face of the guide rail 4, and through the supporting member 15 attached to the wheel housing structure. A spring 12 surrounds the machine screw 14 between the guide rail 4 and its support member 15. The machine screw 14 extends beyond the support member 15 and is surrounded by a sleeve 13, through which the screw 14 may move during compression. The screw 14 is terminated by locking nuts 16, at the end of the sleeve 13, thus allowing compression of the spring 12 surrounding the screw 14 while preventing extension beyond the limit set by the lock nuts 16.

Figure 4:
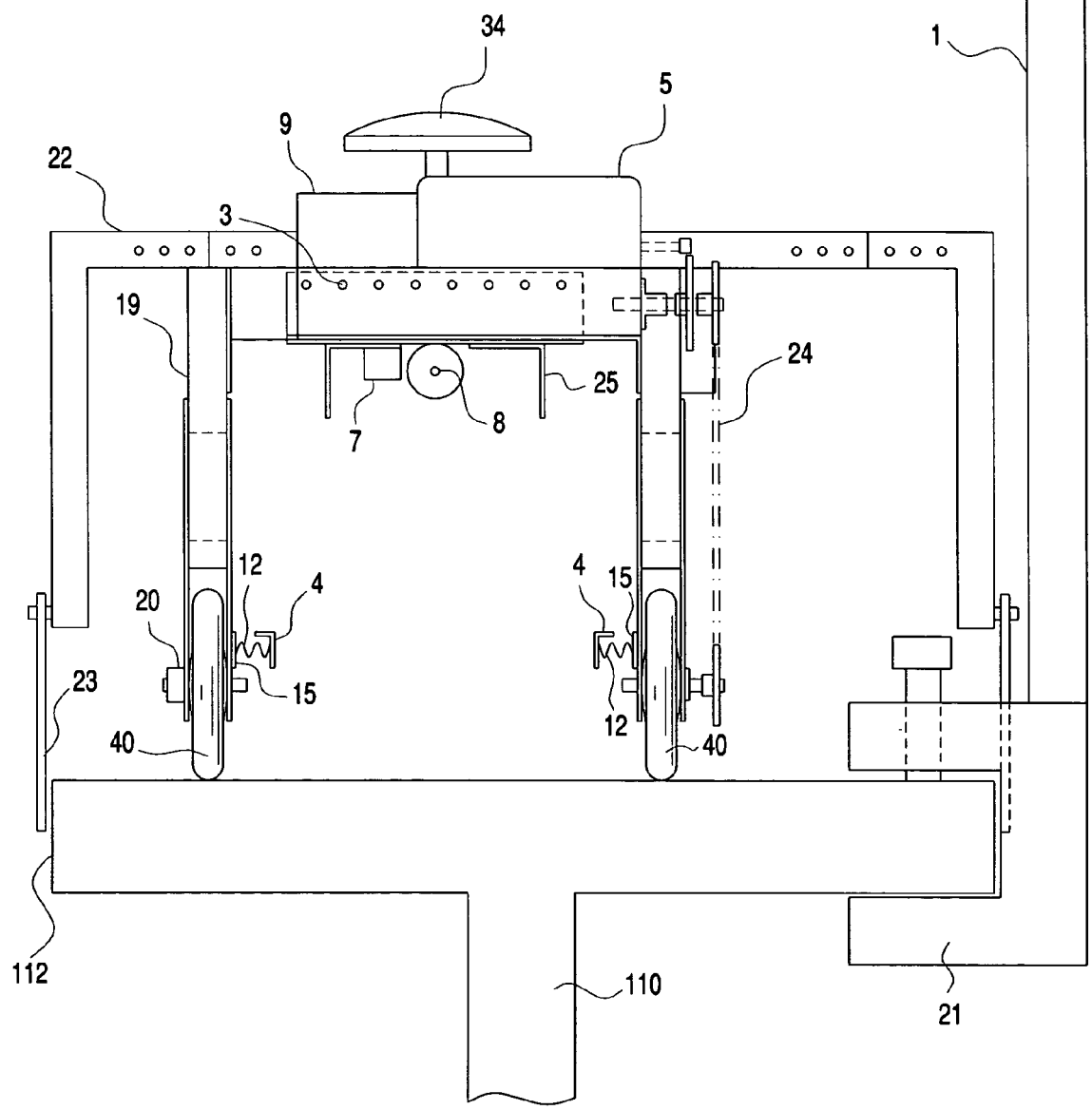
FIG. 4 s a front elevation view of the second embodiment of the present invention with a GPS receiver.

In situations where a structural beam lacks shear studs 18 or another vertical guiding surface that can be utilized for guiding the carriage along the length of the beam 110, such as described in the first embodiment of the invention above, the frame and platform 25 of the carriage of the present invention may be equipped with individually adjustable out-rigger type edge guides 23, such as shown in the second embodiment of the present invention in FIG. 4.

FIG. 4 is a front elevation view of the carriage 200 in FIG. 2. In FIG. 4, the carriage 200 is in position atop a beam 110 with its edge guides 23 and temporary safety cable support post 1 with anchorage assembly 21. These edge guides 23 are set initially to come into contact with the outer edges 112 of the beam's top flange or surface to be traversed. The contact surface of the guides 23 are attached to a guide brace 22, which extends outwardly from the carriage frame and platform 25 by a swingable hinge or pivot point thereby allowing constraint in forward or reverse motion and the ability to ride up and return gravitationally to their original positions, such as when encountering safety cable post anchorage 21, structural cross members, and others. Alternative illustrations of the pivotable edge guides 23 are shown in FIGS. 6B and 6C.

In FIG. 4, an optional GPS receiver 34 is shown. The GPS receiver 34 may be mounted in combination with or in place of the data collection target 2 shown in FIG. 3.

Figure 6C:
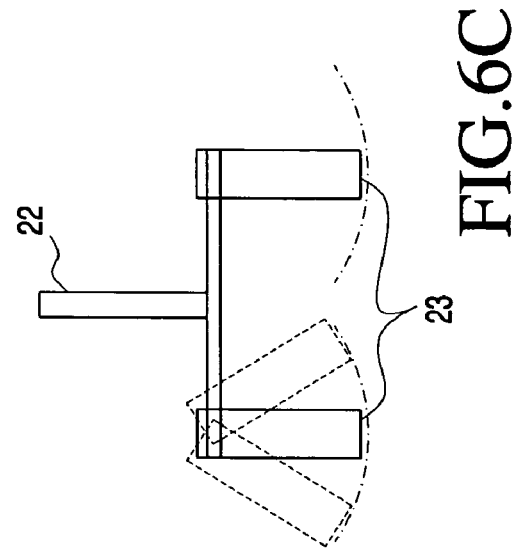
FIG. 6C is a side view of the pivotably mounted edge guides.

It is preferable that at least two edge guides per side, such as shown in FIG. 6C, be employed so that, as one is out of contact with the guiding edge of the beam 110 while riding over an obstacle, such as a post anchorage 21, another will be in contact with the edge 112 of beam 110 thereby maintaining direction control.

The edge guides 23 are adjustable in a manner described above with respect to the first embodiment with alignment holes 3 and can be set to a constant spacing and held in place by bolts, Clovis pins, or other fasteners in cases where the beam or surface is of constant width.

Figure 6A:
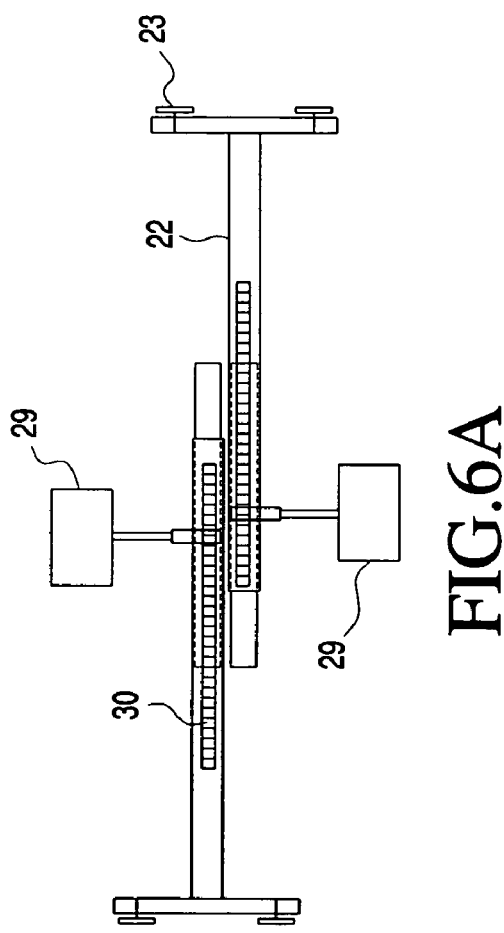
FIG. 6A is a top plan view of a motorized edge guides of the second embodiment of the present invention.
Figure 6B:
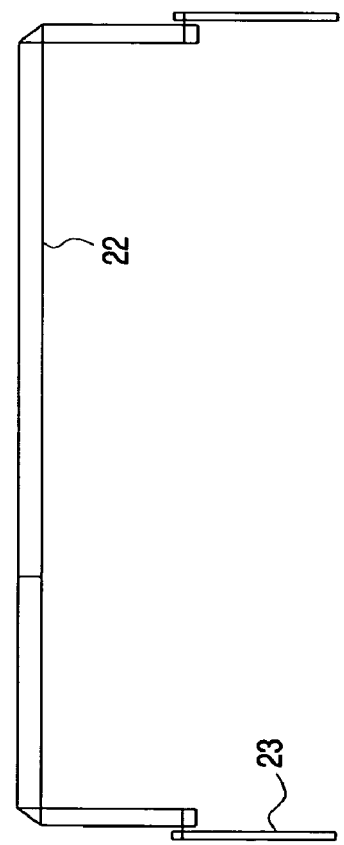
FIG. 6B is a front elevation view of the edge guides.

When the beam or surface width of the beam 110 is not constant but transitions in mid-span to a wider or narrower dimension, these edge guides 23 may be equipped with positioning controls and actuators, such as rack and pinion gear 30 and motor 29, as shown in FIG. 6A, for span adjustment while traversing the surface by activation at predetermined intervals or by radio control at desired positions.

In FIG. 5, the carriage 100 is equipped with a processing unit 17, such as a preset counter or microprocessor for managing motor/encoder 20, feedback, start/stop and timed interval execution, task execution, and others.

Figure 8:
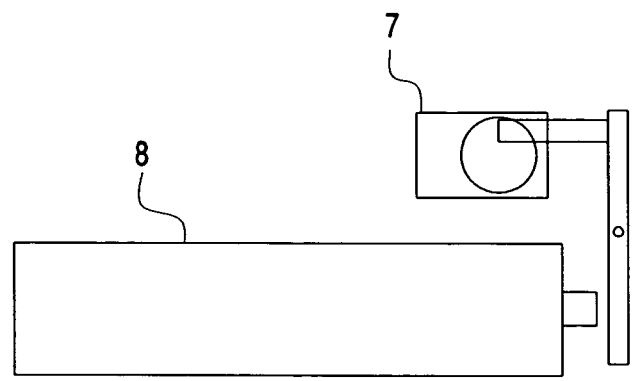
FIG. 8 is an illustration of an emitter assembly and its actuator.

As previously mentioned, the undercarriage of the carriage is equipped with an emitter 8, such as a spray paint can 8, which marks the surface at data collection points automatically by onboard actuator 7, which may be a solenoid or an electrical motor, as shown in FIG. 8. Mounting hardware 26, capable of accepting a removable data collection target 2, camera, or similar device, is located atop the elevated frame and platform 25 at a height sufficient to allow observation from a remote data collection instrument, if required.

As in the case of bridge construction and similar undertakings where the initial data collection point is located in a position of limited space, such as bridge abutments, where space behind the initial point is limited by on-going construction, formwork, reinforcing steel at the abutment backwall 28, etc., two of the data collection target mounting locations are provided on the frame and platform 25, such as shown in FIG. 5.

The removable data collection target mounting hardware 26 is preferably positioned centrally to the width of the platform with one mounting bracket located forward of longitudinal center, another located rearward of center. This configuration allows, in a case where the clearance between the initial data collection point on the beam and the above mentioned obstacles is less than the dimension from a centrally located target and the end of the frame/platform or drive components of the carriage, temporary placement of the data collection target 2 on its rearward mounting bracket while data is collected at that point. The data collection target 2 is then moved to its forward mounting bracket and the initial required distance interval adjusted accordingly and normal operation commences. In this manner, when the carriage reaches the far end of the beam to be traversed, the data collection target 2 will be positioned on the carriage at a point minimizing the distance from target to end of frame and platform 25, in case a mirror image of starting conditions exist.

When data is to be collected by the method of observing a graduated engineering or graduated rod 31 through an engineers auto level, a centrally located mounting bracket 32, shown in FIG. 7A, may be employed with a graduated scale/rod 31 affixed by pivot point 33 connection to a balance point of the bottom weighted rod allowing gravity directed plumbness throughout positive or negative gradients and super elevated curves encountered.

A preferred recording instrument to be utilized with the carriage of the present invention may be any of several total station survey instruments with auto record software programs, such as LEICA™ TPS 1100, having a sub-routine with "stop and go" mode wherein the instrument locks onto and follows the target as it moves but does not record data until the target is at rest for a specified time interval. As the carriage traverses its course and automatically halts at prescribed intervals, the remote instrument records the data while the carriage is at rest for a predetermined duration or until movement is restarted by remote control.

The frame and platform 25 is equipped with a laser plumb or optical plumb for alignment of the target and the initial point for data collection. The length of the wheel or track placement is sufficient to come into contact with a minimum of two of the shear studs 18 to prevent twisting motions of the carriage or the ability to pass between the guiding studs thereby escaping the surface. Further, the length is limited sufficiently to allow conformity to a curved trajectory and ease of handling and transport to the work place and within the workplace.

The weight of the carriage and its components is of sufficient mass to prevent wind gusts, sudden shocks, etc. from dislodging the carriage from a structural beam or work location. The stability of the carriage is aided by the use of the previously described spring pressure guide rails 4 and the shear studs 18, which are normally 6 to 9 inch high round columns of steel welded to a structural beam. The top of the shear studs 18 normally includes a head 42, as shown in FIG. 3, of the same material of larger diameter welded to the stud. The spring pressure guide rails 4 exert pressure against the smaller diameter body of the shear studs 18 so that upward lifting forces are held in check by the guide rails' contact with the larger diameter top of the head 42 of the shear studs.

The carriage and its components are of a weight which permits ease of handling in moving the carriage within the work place and placing it atop the work surface.

The carriage may be equipped with a removable top mounted tray or basket (not shown) providing unmanned transport of tools or other items to or from workers located along the beam. The basket connects to the frame at four points with minimum clearance above platform components maintaining a low center of gravity. The basket preferably has a low profile and a bottom of perforated or wire mesh material reducing wind load and up lift.

In the operation of the carriage of the present invention, the proper guidance method is determined by assessing the conditions of the beam 110 or surface to be traversed. When shear studs 18 are present, determine the optimum wheel or track spacing of the carriage for least resistance and obstacle avoidance, such as safety cable-post 1, with anchorages 21, and adjust the wheel/track span by increasing or decreasing the position of the wheel support members' attachment points or holes 3, to the frame 25 of the carriage allowing for a normal beam arrangement of three rows of shear studs 18 centrally spaced, one front and rear wheel support member to pass between the shear studs closest to the post anchorage 21, and the remaining two to occupy a position between the outer row of shear studs and the outside edge of the beam opposite the edge supporting the cable post anchorage 21.

When shear studs 18 are not present, determine the width of the beam 110 or surface and attach the edge guide braces 22 in the appropriate configuration at their attachment points. Place the carriage atop the beam as described above with the emitter 8 (i.e., spray paint can or point marking device) toward the direction of travel. Adjust the left and right edge guides 23, to come into contact with the outside edges of the top flange of the beam. For a preset counter 17 included with the processing unit, enter the required interval of desired data collection points at the keyboard for process output to motor control.

For automatic return of the carriage, enter the required number of locations at the keyboard for output to motor control. This step is not required in the case of remote control operation wherein the carriage is wirelessly controlled by an operator. The fixed distance between the forward and rearward target positions is set in the counter by turning the wheel 40 equipped with the feedback encoder 20 to register that distance in the counter as a traveled distance of the first interval so that, when the target is relocated from the rearward to the forward position after the initial data collection point is recorded, the following intervals will be correct.

Next, position the data collection target 2 on the rearward attachment point, above the beginning point. The remote recording instrument is set in place and the initial reading is taken and recorded. The data collection target 2 is then relocated to the forward position. This distance is observed on the counter display (not shown) as the wheel housing the feedback encoder 20 is rotated until the distance between the target mounting positions is achieved. The recording instrument's Auto Record program is engaged, and an automatic or remote control is employed to begin the carriage's movement through remaining data collection intervals.

As each data collection point is achieved, the carriage automatically halts for the time interval entered in the onboard preset counter of the carriage. This interval should exceed that which is entered into the AUTO-RECORD program of the recording instrument. For example, if the input for the AUTO-RECORD program is to record data when the target is in a stopped position for 7 seconds, the onboard preset counter should be set to stop for 10 seconds at collection points to allow adequate measurement time for the recording instrument's processing functions to complete as data is automatically recorded by the remote instrument. During this pause of travel at a collection point, the counter activates an output relay activating the point marking mechanism, such as the servo controlled lever 7 to the emitter 8 to spray a spot of paint at the location for future reference. When the prescribed recording time interval has elapsed, the carriage automatically resumes traveling to the succeeding data collection points while halting for data collection and marking each location. The carriage may then be reversed and returned to its starting point or moved to an adjacent beam for additional data collection.

It is believed that the construction, operation and advantages of this invention will be apparent to those skilled in the art. It is to be understood that the present disclosure is illustrative only and that changes, variations, substitutions, modifications and equivalents will be made without departing from the spirit of the inventions defined by the following claims.

What I claim is:

1. A robotic carriage particularly adapted for traversing the length of an elongated structural member, comprising:
    a frame;
    a plurality of wheels rollingly supporting said frame;
    a drive unit mounted on the frame and operatively connected to at least one of said wheels to drive the same;
    a processing and control unit mounted on the frame that controls the drive unit; and
    a guide mechanism including a pair of opposing guide members movably mounted on the frame into sliding engagement with width-wise opposing portions of said structural member.

2. The robotic carriage defined in claim 1, wherein said frame includes a platform, and a plurality of legs supporting said platform, wherein said wheels are rotatably mounted on the ends of said legs.

3. The robotic carriage defined in claim 2, wherein said legs are of sufficient height to support said platform above vertically extending obstacles on an upper surface of said structural member.

4. The robotic carriage defined in claim 2, further comprising a leg width adjustment mechanism that allows a width-wise distance between opposing legs to be adjusted.

5. The robotic carriage defined in claim 1, wherein said guide members include opposing edge guides that slidably engage width-wise opposing edges of said structural member.

6. The robotic carriage defined in claim 5, wherein said edge guides are pivotally mounted on the frame such that said edge guides pivot out of engagement from a side obstacle projecting from said with opposing edges of said structural member.

7. The robotic carriage defined in claim 6, wherein said edge guides pivot back into engagement with said opposing edges of said structural member after disengaging with said side obstacle.

8. The robotic carriage defined in claim 7, wherein said edge guides pivot back into engagement with said opposing edges of said structural member by gravity.

9. The robotic carriage defined in claim 1, wherein said guide members include opposing guide rails that slidably engage opposing, vertically-extending obstacles on an upper surface of said structural member.

10. The robotic carriage defined in claim 9, wherein said vertically-extending obstacles are substantially uniformly spaced along the length of said structural member, and said guide rails are each longer than the lengthwise distance between said vertical obstacles.

11. The robotic carriage defined in claim 9, wherein said guide rails are biased into sliding engagement with said vertical obstacles.

12. The robotic carriage defined in claim 1, wherein said drive unit includes a braking assembly that prevents further movement of the carriage after said processing and control unit issues a stop command.

13. The robotic carriage defined in claim 1, further comprising a data collection tool mounted on said frame.

14. The robotic carriage defined in claim 1, further comprising a marking assembly mounted on said frame and connected to said processing and control unit for providing a visual mark indicative of a location of the carriage along the length of the structural member.

15. The robotic carriage defined in claim 1, wherein said processing and control unit functions to determine a distance of travel along the length of the structural member.

16. A robotic carriage for data collection while traversing a structural beam, comprising:
   a frame including a platform supported by a plurality of legs;
   a plurality of wheels rotatably connected to supporting ends of said legs;
   a drive unit mounted on the frame and operatively connected to at least one of said wheels to drive the same;
   a processing and control unit mounted on the frame that controls the drive unit;
   a guide mechanism including a pair of opposing guide members movably mounted on the frame into sliding engagement with width-wise opposing portions of said structural member; and
   a data collection tool mounted on said frame.

17. The robotic carriage defined in claim 16, wherein said beam includes shear studs vertically projecting from its upper surface, and said legs are sufficiently high to raise said platform above said studs.

18. The robotic carriage defined in claim 17, wherein said guide member includes opposing guide rails that slidably engage said vertical shear studs to guide said frame.

19. The robotic carriage defined in claim 17, further comprising a leg width adjustment mechanism that adjusts a width-wise distance between opposing legs such that said legs avoid contacting said vertical shear studs.

20. The robotic carriage defined in claim 16, wherein said guide members include opposing edge guides that slidably engage width-wise opposing edges of said structural member.

21. The robotic carriage defined in claim 16, further comprising a marking assembly mounted on said frame and connected to said processing and control unit for providing a visual mark indicative of a location of the carriage along the length of the structural member; and
   an optical or laser plumb, or alignment markers disposed on the frame so as to assist in the positioning of the carriage at an initial beginning point.

22. The robotic carriage defined in claim 16, further comprising a removable basket on said platform for carrying tools.

23. The robotic carriage defined in claim 16, further comprising means for automatic restarting or remote controlled restarting to a next position.

24. The robotic carriage defined in claim 16, wherein the data collection tool includes a video camera, an optical data target, a GPS receiver and an engineering rod.

* * * * *